United States Patent
Patel et al.

(10) Patent No.: US 10,104,445 B2
(45) Date of Patent: Oct. 16, 2018

(54) SYSTEMS AND METHODS FOR PROVIDING A PLAYLIST OF USER-RELEVANT CONTENT FOR PLAYBACK IN PLACE OF ADVERTISEMENT CONTENT

(71) Applicant: Rovi Guides, Inc., San Carlos, CA (US)

(72) Inventors: Milan Indu Patel, Santa Clara, CA (US); Kevin Scott Bright, Gilroy, CA (US); Emily Louise Weigand, Morgan Hill, CA (US); Nancy Huynh, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/088,403

(22) Filed: Apr. 1, 2016

(65) Prior Publication Data

US 2017/0289641 A1    Oct. 5, 2017

(51) Int. Cl.
| | |
|---|---|
| *H04N 21/81* | (2011.01) |
| *H04N 21/262* | (2011.01) |
| *H04N 21/482* | (2011.01) |
| *H04N 21/231* | (2011.01) |
| *H04N 21/845* | (2011.01) |
| *G11B 27/10* | (2006.01) |

(Continued)

(52) U.S. Cl.
CPC .......... *H04N 21/812* (2013.01); *G11B 27/10* (2013.01); *H04N 21/23109* (2013.01); *H04N 21/25891* (2013.01); *H04N 21/26258* (2013.01); *H04N 21/4312* (2013.01); *H04N 21/4532* (2013.01); *H04N 21/4825* (2013.01); *H04N 21/6125* (2013.01); *H04N 21/8456* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| (Continued) | | |

FOREIGN PATENT DOCUMENTS

| | | |
|---|---|---|
| EP | 1 158 791 | 11/2001 |
| EP | 1 705 908 | 9/2006 |
| WO | WO 2008/007274 | 1/2008 |

OTHER PUBLICATIONS

U.S. Appl. No. 14/673,493, filed Mar. 30, 2015, Maltar et al.
International Search Report and Written Opinion dated Jun. 28, 2017 for PCT Application No. US2017/024599, 13 pages.

*Primary Examiner* — Omar S Parra
(74) *Attorney, Agent, or Firm* — Haley Guiliano LLP

(57) ABSTRACT

Systems and methods are provided herein for generating and providing a playlist of content relevant to a user that is to be played back instead of advertisement content. In some embodiments, a media guidance application may access a profile of a user, and may generate a playlist comprising a plurality of program content based on data of the profile. The media guidance application may determine that advertisement content is imminently to be played back to the user, and, in response to determining that the advertisement content is imminently to be played back to the user, the media guidance application may select program content of the playlist to play back instead of the advertisement content, and generate for display the program content.

18 Claims, 5 Drawing Sheets

(51) Int. Cl.
*H04N 21/258* (2011.01)
*H04N 21/45* (2011.01)
*H04N 21/61* (2011.01)
*H04N 21/431* (2011.01)

(56) References Cited

U.S. PATENT DOCUMENTS

| | | |
|---|---|---|
| 7,165,098 B1 | 1/2007 | Boyer et al. |
| 7,493,646 B2 | 2/2009 | Ellis |
| 7,502,513 B2 | 3/2009 | Linzer |
| 7,761,892 B2 | 7/2010 | Ellis et al. |
| 8,046,801 B2 | 10/2011 | Ellis et al. |
| 9,113,207 B2 | 8/2015 | Schein et al. |
| 9,723,371 B2 * | 8/2017 | Stephens ............... H04N 5/445 |
| 2002/0174430 A1 | 11/2002 | Ellis et al. |
| 2004/0103429 A1 | 5/2004 | Carlucci et al. |
| 2004/0237102 A1 | 11/2004 | Konig et al. |
| 2005/0251827 A1 | 11/2005 | Ellis et al. |
| 2008/0297669 A1 * | 12/2008 | Zalewski ............... H04N 7/163 |
| | | 348/844 |
| 2009/0210899 A1 * | 8/2009 | Lawrence-Apfelbaum ................ |
| | | H04L 12/2801 |
| | | 725/34 |
| 2010/0153885 A1 | 6/2010 | Yates |
| 2013/0086607 A1 | 4/2013 | Tom et al. |
| 2013/0346430 A1 | 12/2013 | Tang et al. |
| 2013/0347029 A1 | 12/2013 | Tang et al. |
| 2016/0094893 A1 * | 3/2016 | Tse ..................... H04N 21/812 |
| | | 725/32 |
| 2017/0118500 A1 * | 4/2017 | Carroll ............... H04N 21/4126 |

\* cited by examiner

US 10,104,445 B2

SYSTEMS AND METHODS FOR PROVIDING A PLAYLIST OF USER-RELEVANT CONTENT FOR PLAYBACK IN PLACE OF ADVERTISEMENT CONTENT

BACKGROUND

Advertisements are becoming pervasive in all forms of program consumption. Whether a user views a program through broadcast, over-the-top ("OTT"), streaming, or any other means, a user is often subjected to long breaks in between segments of the program where advertisements are inserted. While advertisers have made efforts to target advertisements closely to users based on robust user profiles, users still prefer not to be subjected to advertisements.

SUMMARY

To this end, systems and methods are provided herein for generating and providing a playlist of content relevant to a user that is to be played back instead of advertisement content. The playlist is designed to be program content—as opposed to advertisement content—that is limited to a small amount of content that the user is likely desirous of seeing at the time the content replaces the advertisement content. For example, if a user is viewing a football game when many football games are playing, the playlist may be populated with highlights from the concurrently playing football games that the user likely did not yet see. If the user is closely following election results, the playlist may include a brief news clipping that was recorded earlier that day that discusses election results, and this news clipping may be displayed in lieu of a commercial. Many more applications of these systems and methods are described in the disclosure.

In some aspects of the disclosure, a media guidance application of executed by control circuitry of a user equipment may access a profile of a user. For example, the profile may be accessed from storage of the user equipment, or may be accessed from a remote database by way of a communications network.

In some embodiments, the media guidance application may generate a playlist comprising a plurality of program content based on data of the profile. In some embodiments, in order to generate the playlist, the media guidance application may add any program content that it determines the user is likely to prefer based on data of the profile.

In some embodiments, the media guidance application may generate the playlist by first determining a plurality of typical durations of advertisement content, where each typical duration of the plurality of typical durations corresponds to a different typical duration of advertisement content. The media guidance application may then add a set of program content to the playlist, where each program content of the set corresponds to each respective different typical duration. Thus, the media guidance application may ensure that the playlist includes program content of varying lengths such that an appropriately length program content can be used to replace an advertisement content of similar length.

In some embodiments, the media guidance application may, when adding the set of program content, automatically record various program content based on the profile. For example, the media guidance application may record program content that the user is likely to enjoy based on the user's profile, but without the user having explicitly requested the recording. The media guidance application may then identify a plurality of segments of the various program content, where each segment of the plurality of segments has a duration that corresponds to each respective typical duration, and wherein each segment of the plurality of segments is relevant to the user. The media guidance application may then add each segment of the plurality of segments to the playlist. By this method, the media guidance application may use segments of recorded broadcast media to populate the playlist.

In some embodiments, the media guidance application may determine that advertisement content is imminently to be played back to the user. For example, if the user is viewing broadcast media, the media guidance application may detect that a threshold darkness level has been detected, thus signaling a transition to advertisement content. As another example, if the user is viewing streaming media, the media guidance application may determine in advance when a break is to occur based on indicia of a progress bar associated with the streaming media.

In some embodiments, in response to determining that the advertisement content is imminently to be played back to the user, the media guidance application may select program content of the plurality of program content of the playlist to play back instead of the advertisement content, and may generate for display the program content. In some embodiments, the media guidance application may select the program content by automatically playing back a first program content of the playlist.

In some embodiments, the media guidance application may deliberately select a program content of the playlist. For example, the media guidance application may select the program content of the plurality of program content to play back instead of the advertisement content by selecting first program content of the set that has a duration that corresponds to a duration of the advertisement content.

In some embodiments, the media guidance application may select the program content of the plurality of program content to play back instead of the advertisement content by identifying first program content of the playlist that is relevant to a program that the user is presently viewing. For example, if a user is viewing a football game, the media guidance application may identify program content of other football games on the playlist as relevant. The media guidance application may then determine whether the first program content is likely to be interesting to the user based on the profile. For example, the media guidance application may determine that the user enjoys football highlights from his favorite teams, and thus a big play highlight that is on the playlist from one of his favorite teams is likely to be interesting to the user. In response to determining that the first program content is likely to be interesting to the user, the media guidance application may select the first program content from the plurality of program content.

In some embodiments, the media guidance application may generate for display the program content based on at least one of receiving user input that requests the advertisement content be replaced by the program content, and detecting a pre-set request to transition to the program content when any advertisement content is played back. Thus, the media guidance application may be triggered to replace the advertisement content with the program content based on either a user input, or based on a setting (e.g., set in advance by the user).

In some embodiments, the media guidance application may periodically evaluating the playlist in order to ensure that the playlist is always representative of program content that the user is highly interested in. The media guidance application may determine, during the evaluating, whether first program content of the playlist is no longer relevant to the user. For example, the user may base this determination based on genre of the first program content (e.g., determine whether a user has grown a distaste or boredom for this genre), age of the first program content (e.g., is the program content so old that it is no longer likely to be interesting to the user), and type of the first program content (e.g., is the program content of the type that at a particular time, he will be unlikely to enjoy it). The media guidance application may, in response to determining that the first program content of the playlist is no longer relevant to the user, remove the first program content from the playlist.

In some embodiments, when the user is presently viewing a program that is provided through the Internet, and when the advertisement content is Internet advertisement content, the media guidance application may determine a duration of the Internet advertisement content based on an indicia of the duration by the Internet advertisement content. For example, when the Internet advertisement content begins, the Internet advertisement content may indicate a duration of the Internet advertisement content break (e.g., by way of a countdown timer), and the media guidance application may determine therefrom the duration. Thus, when selecting the program content of the plurality of program content of the playlist to play back, the media guidance application may select program content that has a duration which corresponds to the duration of the Internet advertisement content.

In some embodiments, the media guidance application may receive user input to replace the advertisement content with the program content in relation to a first user equipment, such as a television, but with a request to view the program content on a second user equipment, such as a tablet computer. The media guidance application may then generate for display the program content on the second user equipment.

In some embodiments, the playlist may include both content caused to be recorded by user equipment of the user (e.g., broadcast content that the user has recorded), as well as Internet content, such a streaming, downloaded, or OTT content. The content may be locally cached or may be accessed when requested from a remote location.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
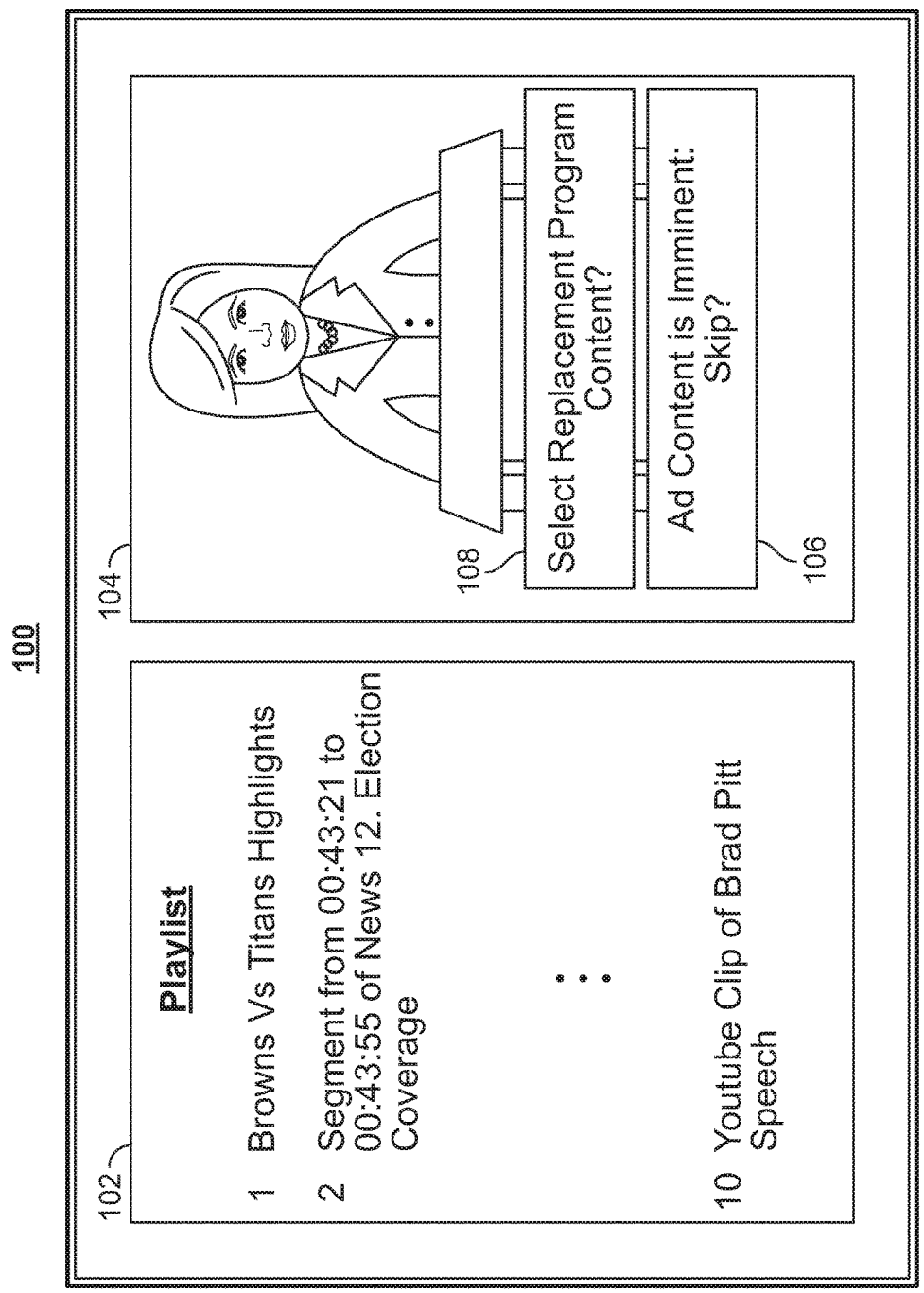
FIG. 1 depicts user equipment that may replace advertisement content that is to be imminently played back with program content of a playlist, in accordance with some embodiments of the disclosure.

FIG. 1 depicts user equipment that may replace advertisement content that is to be imminently played back with program content of a playlist, in accordance with some embodiments of the disclosure. FIG. 1 depicts user equipment 100. The functionality of various user equipment will be described below with respect to FIGS. 2-5, and applies to user equipment 100. User equipment 100 may generate for display and/or access playlist 102. User equipment 100 may have control circuitry installed thereon that executes a media guidance application. The control circuitry and media guidance application are also discussed below in further detail with respect to FIGS. 2-5.

The media guidance application of user equipment 100 may cause media to be displayed using display 104. Display 104 may include advertisement content or program content. Display 104 may also be used by the media guidance application for a display of skip option 106, and replace option 108, either or both of which may be generated for display by the media guidance application.

In some aspects of the disclosure, the media guidance application may access a profile of a user. For example, the profile may be accessed from storage of the user equipment, or may be accessed from a remote database by way of a communications network. The profile may contain preference data of a user, which the media guidance application may collect by monitoring any activity by the user. For example, any interaction of the user with user equipment 100, be it for recording, browsing media, accessing Internet content, viewing media, tuning away from media, or any other interaction that user equipment 100 avails the user of, may be added to the profile by the media guidance application. Further, the profile may contain data monitored by the user when using other user equipment. Ultimately, when the media guidance application receives and processes data of the profile, the media guidance application can therefrom estimate program content that the user will most enjoy.

In some embodiments, the media guidance application may generate a playlist (e.g., playlist 102) comprising a plurality of program content based on data of the profile. In some embodiments, in order to generate the playlist, the media guidance application may add any program content that it determines the user is likely to prefer based on data of the profile. While playlist 102 is depicted in FIG. 1 as generated for display on user equipment 100, playlist 102 may alternatively be generated for display on a different, second user equipment that is used by the user to select program content for display on either user equipment 100 or the second user equipment. Alternatively, playlist 102 need not be displayed at all, and instead, the media guidance application may simply select program content therefrom to play back to the user automatically.

Playlist 102 is a dynamically changing playlist that is designed to represent a small number of top recommendations of program content that the user is likely to prefer viewing (e.g., in display 104, or on a display of a different user equipment) in lieu of an advertisement. For example, playlist 102 may receive frequent additions and deletions of content as the media guidance application detects that a user's mood or preferences change. The media guidance application may also supply additions and deletions to playlist 102 based on the relevance of the addition or deletion, as well as the relevance of the content already on playlist 102, to what the media guidance application is presently generating for display in display 104. Adjustments to playlist 102 are discussed in further detail below.

In some embodiments, the media guidance application may ensure that it has program content on playlist 102 of varying durations, thus ensuring that a contained segment of content will fit in its entirety during a duration of advertisement of content. To this end, the media guidance application may generate the playlist by first determining a plurality of typical durations of advertisement content, where each typical duration of the plurality of typical durations corresponds to a different typical duration of advertisement content. For example, the media guidance application may determine that advertisement content typically occurs in 15 second increments, as short as 15 seconds, and as long as two minutes. The media guidance application may then add a set of program content to the playlist, where each program content of the set corresponds to each respective different typical duration (i.e., 15 seconds, 30 seconds, 45 seconds, 60 seconds, 75 seconds, 90 seconds, 105 seconds, and 120 seconds). Thus, the media guidance application may ensure that the playlist includes program content of varying lengths such that an appropriately length program content can be used to replace an advertisement content of similar length.

In some embodiments, the media guidance application may, when adding the set of program content, automatically record various program content based on the profile. For example, the media guidance application may record program content that the user is likely to enjoy based on the user's profile, but without the user having explicitly requested the recording. This may be a recording of either the entire program content, or a segment that the media guidance application predicts will be particularly interesting to the user. Automatic recording of program content, and of segments of program content, is described in U.S. patent application Ser. No. 14/673,493, filed Mar. 30, 2015, now pending, as well as U.S. Pat. No. 9,113,207, issued on Aug. 18, 2015, the disclosures of which are hereby incorporated by reference herein in their entireties. If the program content was recorded in its entirety or in too long of segments to be useful to replace a short advertisement, the media guidance application may then identify a plurality of segments of the various program content, where each segment of the plurality of segments has a duration that corresponds to each respective typical duration, and wherein each segment of the plurality of segments is relevant to the user. The media guidance application may then add each segment of the plurality of segments to playlist 102. By this method, the media guidance application may use segments of recorded broadcast media to populate the playlist.

In some embodiments, the media guidance application may determine that advertisement content is imminently to be played back to the user (e.g., that a program being played back in display 104 is to be replaced by advertisement content in display 104). For example, if the user is viewing broadcast media, the media guidance application may detect that a threshold darkness level has been detected, thus signaling a transition to advertisement content. Detection of commercials in broadcast media is described in U.S. Pat. No. 7,502,513, issued on Mar. 10, 2009, the contents of which are hereby incorporated by reference herein in their entirety. As another example, if the user is viewing streaming, Internet, or OTT media, the media guidance application may determine in advance when a break is to occur based on indicia of a progress bar associated with the streaming media, or through any other means of recognizing that an advertisement has begun or is about to begin.

In some embodiments, in response to determining that the advertisement content is imminently to be played back to the user, the media guidance application may select program content of the plurality of program content of the playlist to play back instead of the advertisement content, and may generate for display the program content (e.g., in display 104, or on a display of a different user equipment).

In some embodiments, the media guidance application may select the program content by automatically playing back a first program content of the playlist when ad content is imminent. In this instance, the media guidance application likely will not generate for display playlist 102, and will simply select a most relevant program content from playlist 102 to play back. For example, the media guidance application may select the program content of the plurality of program content to play back instead of the advertisement content by selecting first (e.g., highest ranked) program content of the set that has a duration that corresponds to a duration of the advertisement content.

In some embodiments, the media guidance application may select the program content of the plurality of program content to play back instead of the advertisement content by identifying first program content of the playlist that is relevant to a program that the user is presently viewing. In order to determine what is relevant to a program that the user is presently viewing, the media guidance application may analyze metadata associated with the program the user is presently viewing. For example, the metadata may include lead actors, genre information, title information, whether the program is part of a series of programs, and the like. For example, if a user is viewing a football game, the media guidance application may identify program content of other football games, or all other sports games, on the playlist as relevant. The media guidance application may then determine whether the first program content is likely to be interesting to the user based on the profile. For example, the media guidance application may determine that the user enjoys football highlights from his favorite teams, and thus a big play highlight that is on the playlist from one of his favorite teams is likely to be interesting to the user. As an example, if the user is a big fan of the football team the Tennessee Titans, and a Browns v. Titans game yielded a big highlight, this may be pushed to the top of playlist 102, as is depicted in FIG. 1. In response to determining that the first program content is likely to be interesting to the user, the media guidance application may select the first program content from the plurality of program content.

In some embodiments, the media guidance application may generate for display the program content based on at least one of receiving user input that requests the advertisement content be replaced by the program content, and detecting a pre-set request to transition to the program content when any advertisement content is played back. For example, when ad content is imminent, or when ad content has already started playing back in display 104, the media guidance application may generate for display skip option 106 to the user. Skip option 106 may enable the user to replace the advertisement with program content from playlist 102. When the media guidance application detects a selection of skip option 106, the media guidance application may automatically play back program content from playlist 102. Alternatively, the media guidance application may responsively generate for display playlist 102 itself. In some embodiments, a display of playlist 102 may be triggered when media guidance application receives a selection of replace option 108. The media guidance application may generate for display replace option 108 concurrently, instead of, or after generating for display skip option 106. Replace option 108, when selected, will cause the media guidance application to let the user select what program content of playlist 102 is to replace the advertisement content.

In some embodiments, the media guidance application may periodically evaluate playlist 102 in order to ensure that the playlist is always representative of program content that the user is highly interested in. The media guidance application may determine, during the evaluating, whether first program content of the playlist is no longer relevant to the user. For example, the media guidance application may base this determination based on genre of the first program content (e.g., determine whether a user has grown a distaste or boredom for this genre), age of the first program content (e.g., is the program content so old that it is no longer likely to be interesting to the user), and type of the first program content (e.g., is the program content of the type that at a particular time, he will be unlikely to enjoy it). The media guidance application may, in response to determining that the first program content of the playlist is no longer relevant to the user, remove the first program content from playlist 102. Selective removal of content from a list or directory is discussed in U.S. Pat. No. 7,493,646, issued on Feb. 17, 2009, the contents of which are hereby incorporated by reference herein in their entirety.

In some embodiments, when the user is presently viewing a program that is provided through the Internet, and when the advertisement content is Internet advertisement content, the media guidance application may determine a duration of the Internet advertisement content based on an indicia of the duration by the Internet advertisement content. For example, when the Internet advertisement content begins, the media guidance application may detect that the Internet advertisement content indicates a duration of the Internet advertisement content break (e.g., by way of a countdown timer), and the media guidance application may determine therefrom the duration. Thus, when selecting the program content of the plurality of program content of playlist 102 to play back, the media guidance application may select program content that has a duration which corresponds to the duration of the Internet advertisement content.

In some embodiments, the playlist may include both content caused to be recorded by user equipment of the user (e.g., broadcast content that the user has recorded), as well as Internet content, such a streaming, downloaded, or OTT content. For example, as depicted in FIG. 1, playlist 102 includes both a segment of a recorded news program, and an Internet clip derived from the streaming application YouTube. The Internet content may be downloaded and locally cached, or may be accessed when requested from a remote location.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
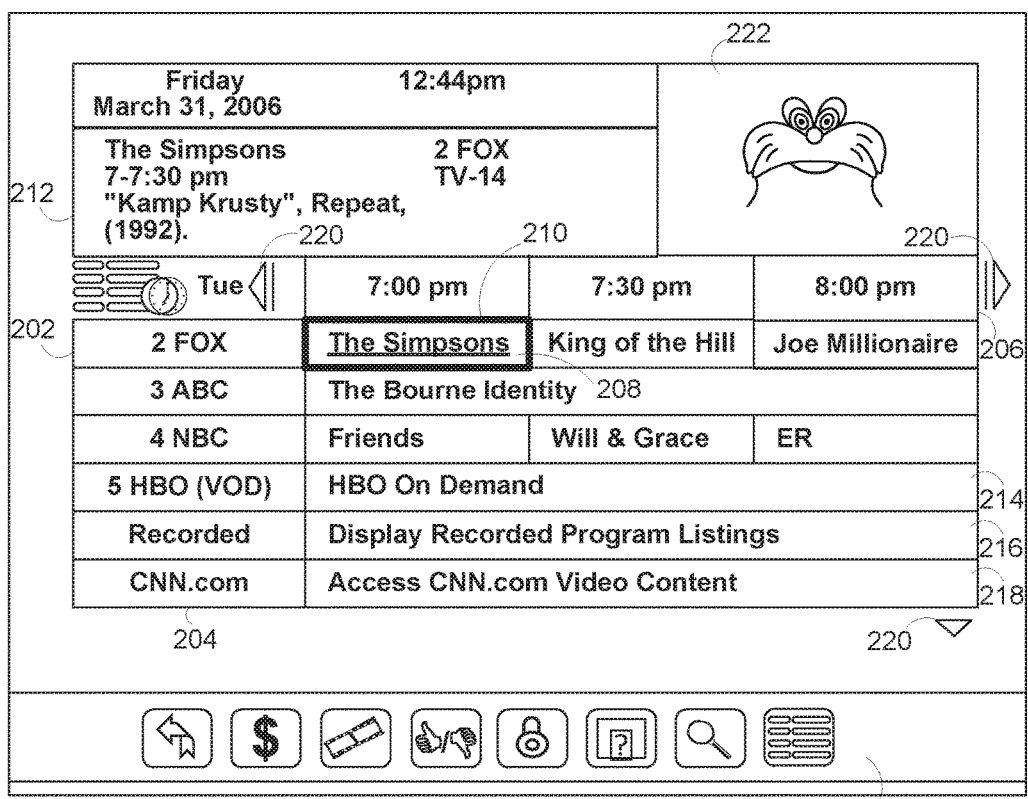
FIG. 2 shows an illustrative embodiment of a display screen that may be used to provide media guidance application listings and other media guidance information, in accordance with some embodiments of the disclosure.
Figure 3:
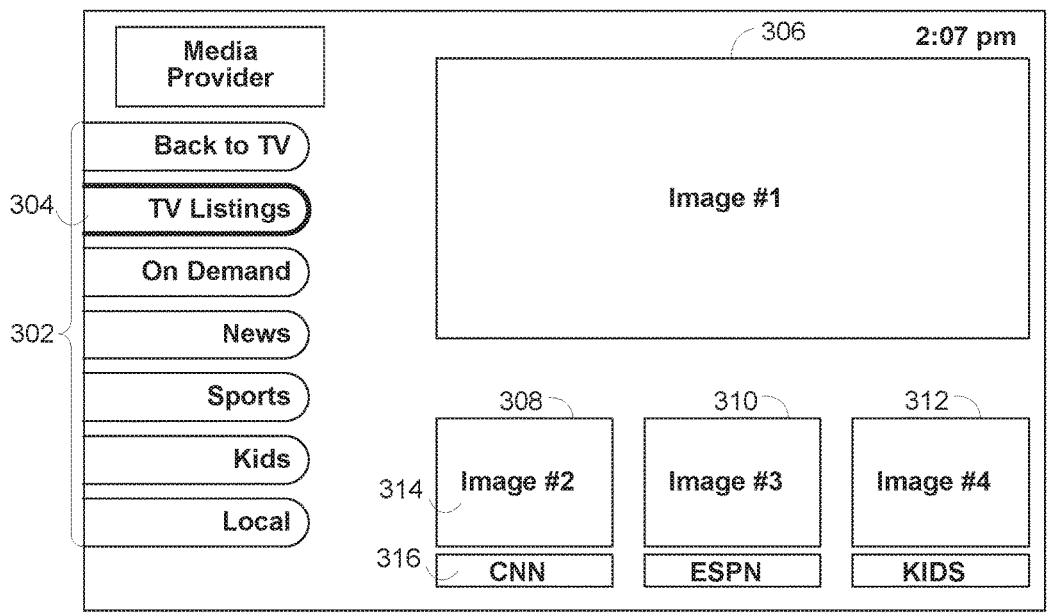
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
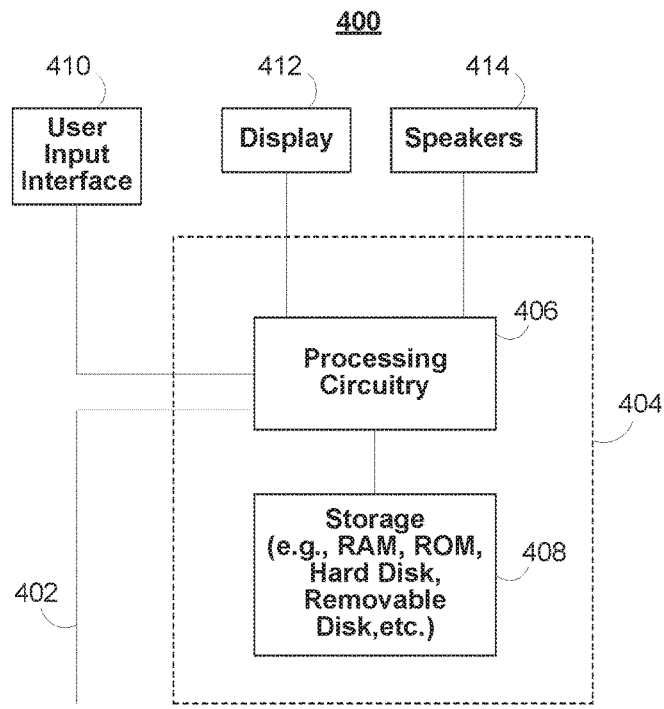
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
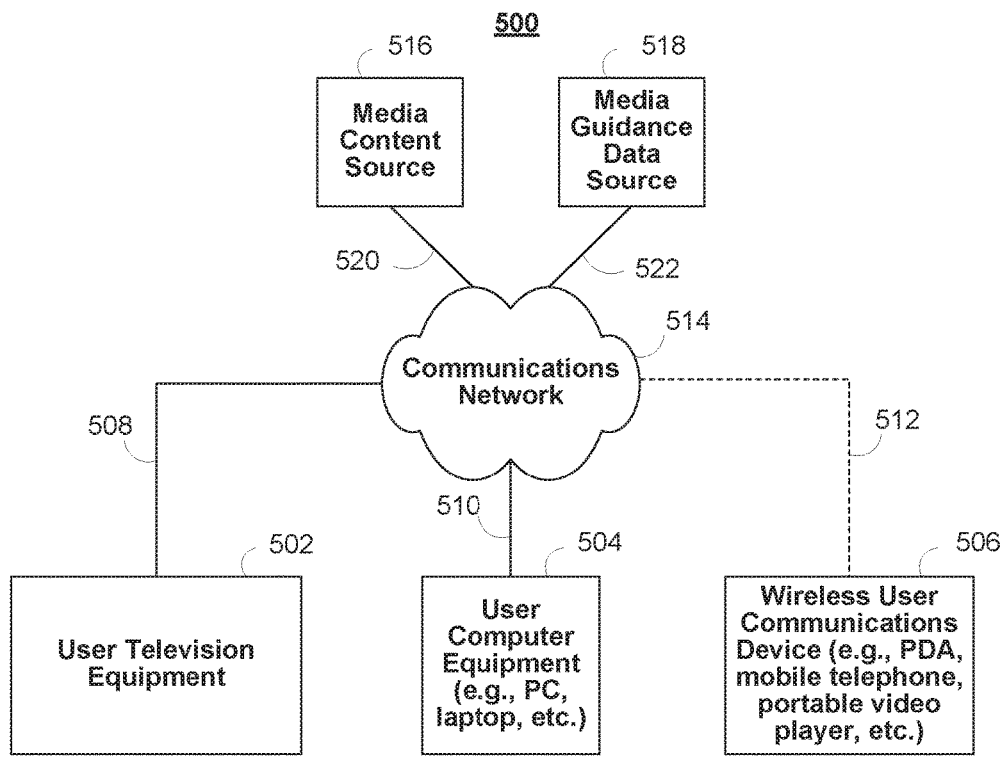
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
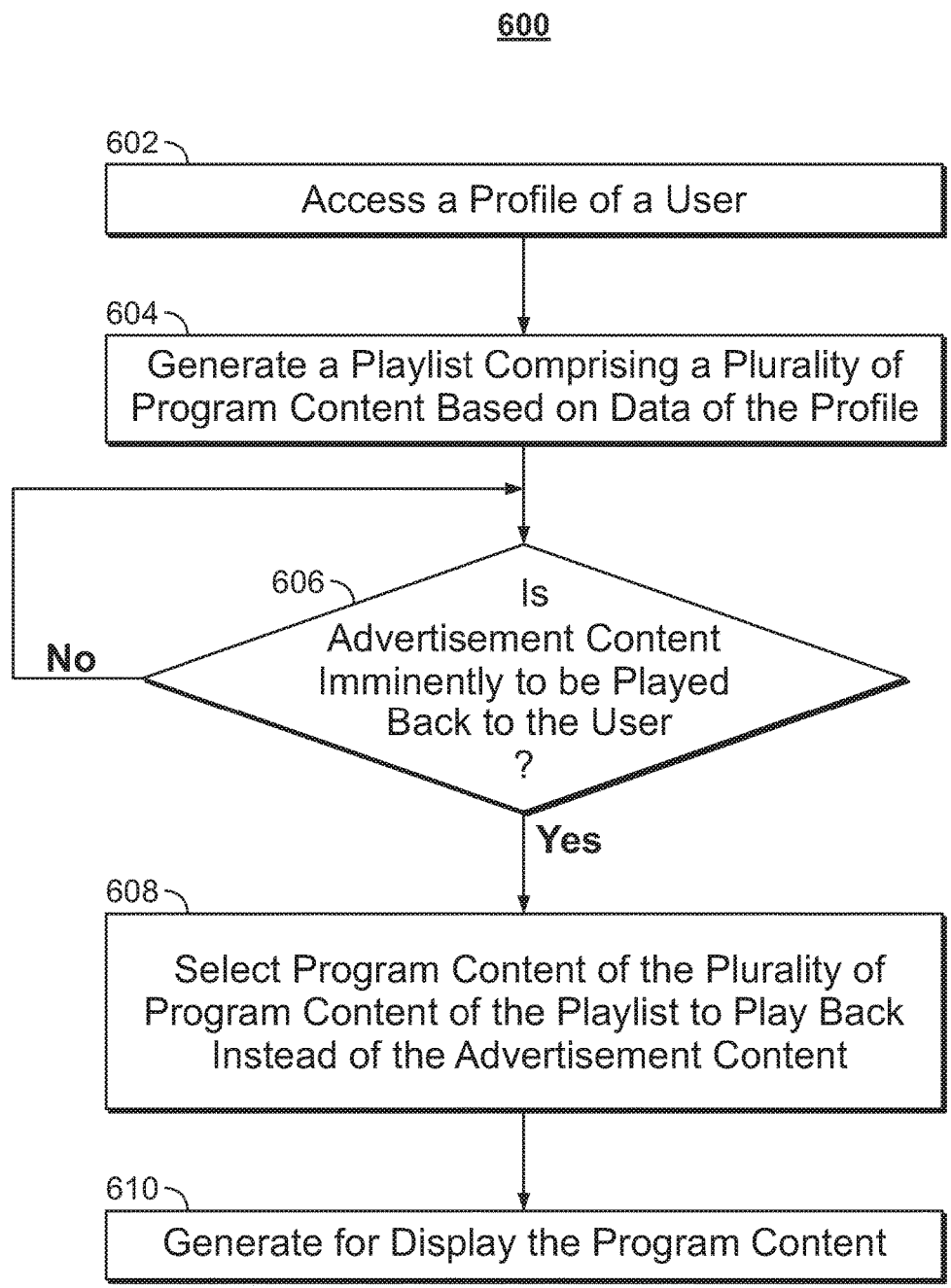
FIG. 6 is a flowchart of illustrative steps involved in generating a playlist of program content, and selecting therefrom a replacement for advertisement content, in accordance with some embodiments of the disclosure.

FIG. 6 is a flowchart of illustrative steps involved in generating a playlist of program content, and selecting therefrom a replacement for advertisement content, in accordance with some embodiments of the disclosure. Process 600 begins at 602, where a media guidance application installed on control circuitry 404 of user equipment 100 may access a profile of a user. User equipment 100 may have the functionality of any or all of user television equipment 502, user computer equipment 504, and wireless user communications device 506. The profile may be located on memory 408 of user equipment 100, or may be located at media guidance data source 518, which may be accessed by the media guidance application by way of communications network 514.

Process 600 may continue to 604, where the media guidance application may generate a playlist (e.g., playlist 102) comprising a plurality of program content based on data of the profile. Generation of the playlist is described further above. The playlist may be stored locally at memory 408 of user equipment 100, or may be located at media guidance data source 518. Both generation of, and updates to, playlist 102 are contemplated by this element of process 600.

At 606, the media guidance application may determine whether advertisement content is to be imminently played back to the user. If advertisement content is not to be imminently played back to the user, 606 may repeat, thus causing the media guidance application to monitor what is being displayed on display 104 until advertisement content is imminent. Note that display 104 may have the functionality of display 412, and the user may interact with anything on display 104 (e.g., skip option 106 and replace option 108) by means of user input interface 410 of user equipment 100.

At 608, the media guidance application may select program content of the plurality of program content of the playlist to play back instead of the advertisement. As discussed above, this selection may be manual by the user, or may be automatic, and may be performed in any manner described above. At 610, the media guidance application may generate for display the program content (e.g., on display 104, or on a display of a second user equipment).

Figure 7:
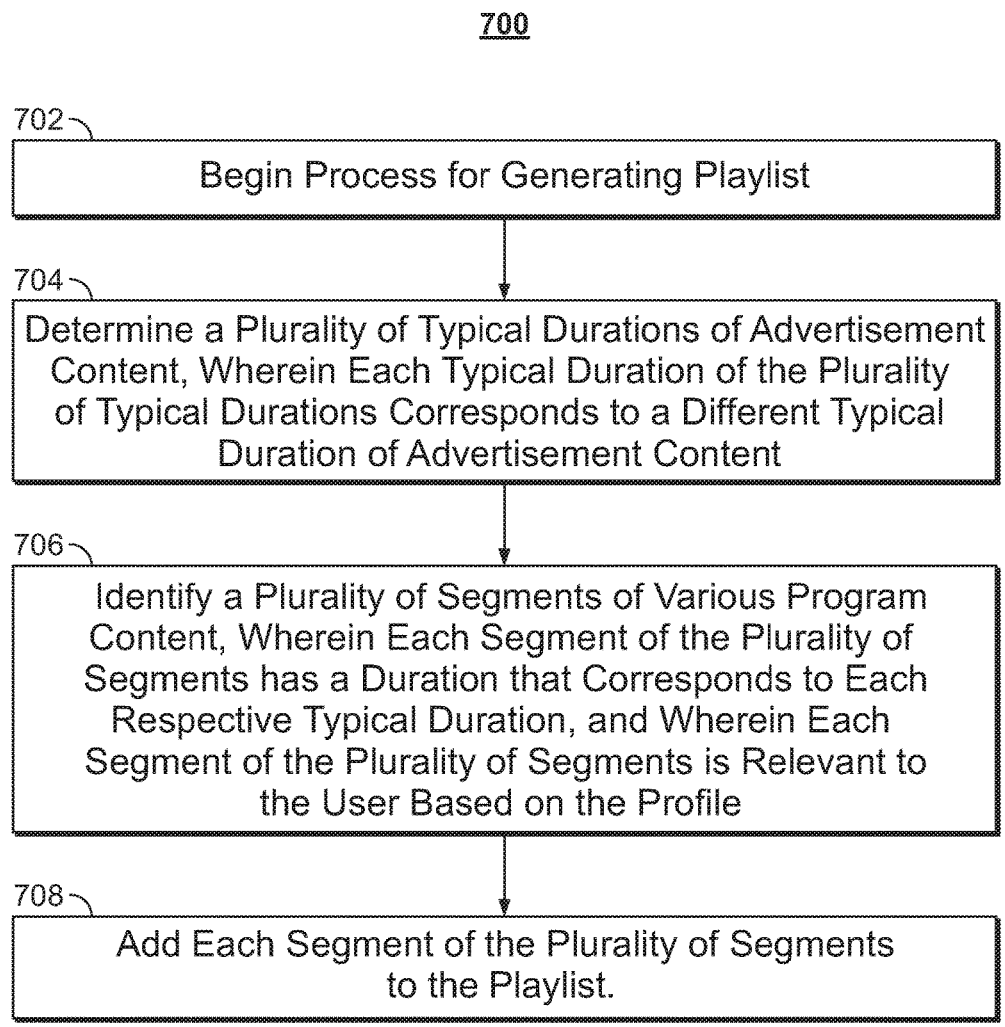
FIG. 7 is a flowchart of illustrative steps involved in generating a playlist of program content for use in replacing advertisement content, in accordance with some embodiments of the disclosure.

FIG. 7 is a flowchart of illustrative steps involved in generating a playlist of program content for use in replacing advertisement content, in accordance with some embodiments of the disclosure. Process 700 begins at 702, where a process begins for generating playlist 102.

At 704, the media guidance application may determine a plurality of typical durations of advertisement content, where each typical duration is different. For example, the media guidance application may access a database, such as media content source 516, which indicates lengths of various advertisement content. The media guidance application may determine therefrom that advertisements are typically 15, 30, 45, or 60 seconds.

Process 700 may continue to 706, where the media guidance application may identify a plurality of segments of various program content, where each segment has a duration that corresponds to an advertisement's typical duration, and is also relevant to the user (e.g., based on the profile). To this end, the media guidance application may assess the duration of each candidate program content to be added to playlist 102, and may select program content that corresponds to 15, 30, 45, and 60 seconds, and also shares a requisite amount of metadata with the profile to be deemed relevant to the user. Process 700 may then continue to 708, where the media guidance application may add each segment of the plurality of segments to the playlist.

It should be noted that processes 600-700 or any step thereof could be performed on, or provided by, any of the devices shown in FIGS. 1 and 4-5. For example, any of processes 600-700 may be executed by control circuitry 404 (FIG. 4) as instructed by control circuitry implemented on user equipment 502, 504, and/or 506 (FIG. 5) in order to select media for playlist 102. In addition, one or more steps of processes 600-700 may be incorporated into or combined with one or more steps of any other process or embodiment.

It is contemplated that the steps or descriptions of each of FIGS. 6-7 may be used with any other embodiment of this disclosure. In addition, the steps and descriptions described in relation to FIGS. 6-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, selecting program content of playlist 102 may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a user profile, as described herein, may be stored in, and retrieved from, storage 408 of FIG. 4, or media guidance data source 518 of FIG. 5. Furthermore, processing circuitry, or a computer program, may update settings associated with a user, such as settings of the user profile, by updating the information stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of generating and providing a playlist of content relevant to a user that is to be played back instead of advertisement content, the method comprising:
    accessing a profile of a user;
    generating a playlist comprising a plurality of program content recorded by the user based on data of the profile, wherein the plurality of program content recorded by the user does not include advertisements;
    determining that advertisement content is imminently to be played back to the user on a first user device;
    in response to determining that the advertisement content is imminently to be played back to the user on the first user device:
        determining a duration of the advertisement content;
        selecting recorded program content of the plurality of program content recorded by the user of the playlist to play back instead of the advertisement content based on a duration of the recorded program content more closely corresponding to the duration of the advertisement content than a duration of any of the other ones of the plurality of program content recorded by the user; and
    generating for display the recorded program content on a second user device while the advertisement content is displayed on the first user device.

2. The method of claim 1, wherein generating the playlist comprises:
    determining a plurality of typical durations of advertisement content, wherein each typical duration of the plurality of typical durations corresponds to a different typical duration of advertisement content; and
    adding a set of program content recorded by the user to the playlist, wherein each program content of the set corresponds to each respective different typical duration.

3. The method of claim 2, wherein adding the set of program content recorded by the user comprises:
    automatically recording various program content based on the profile;
    identifying a plurality of segments of the various program content, wherein each segment of the plurality of segments has a duration that corresponds to each respective typical duration, and wherein each segment of the plurality of segments is relevant to the user; and
    adding each segment of the plurality of segments to the playlist.

4. The method of claim 2, wherein selecting the recorded program content of the plurality of program content recorded by the user to play back instead of the advertisement content comprises selecting first program content of the set that has a duration that corresponds to a duration of the advertisement content.

5. The method of claim 1, wherein selecting the recorded program content of the plurality of program content recorded by the user to play back instead of the advertisement content comprises:
    identifying first program content of the playlist that is relevant to a program that the user is presently viewing;
    determining whether the first program content is likely to be interesting to the user based on the profile; and
    in response to determining that the first program content is likely to be interesting to the user, selecting the first program content from the plurality of program content recorded by the user.

6. The method of claim 1, wherein generating for display the recorded program content is based on at least one of:
    receiving user input that requests the advertisement content be replaced by the program content; and
    detecting a pre-set request to transition to the recorded program content when any advertisement content is played back.

7. The method of claim 1, further comprising:
    periodically evaluating the playlist;
    determining, during the evaluating, whether first program content of the playlist is no longer relevant to the user, wherein determining that the first program content of the playlist is no longer relevant to the user is based on at least one of: genre of the first program content, age of the first program content, and type of the first program content; and
    in response to determining that the first program content of the playlist is no longer relevant to the user, removing the first program content from the playlist.

8. The method of claim 1, wherein the user is presently viewing a program that is provided through the Internet, wherein the advertisement content is Internet advertisement content, and wherein the method further comprises:
determining a duration of the Internet advertisement content based on an indicia of the duration by the Internet advertisement content, and wherein selecting the recorded program content of the plurality of program content recorded by the user of the playlist to play back comprises selecting program content that has a duration which corresponds to the duration of the Internet advertisement content.

9. The method of claim 1, wherein the playlist comprises both (1) content caused to be recorded by user equipment of the user, and (2) streaming content.

10. A system for generating and providing a playlist of content relevant to a user that is to be played back instead of advertisement content, the system comprising:
communications circuitry; and
control circuitry on a first user device configured to:
access, using the communications circuitry, a profile of a user;
generate a playlist comprising a plurality of program content recorded by the user based on data of the profile, wherein the plurality of program content recorded by the user does not include advertisements;
determine that advertisement content is imminently to be played back to the user on the first user device;
in response to determining that the advertisement content is imminently to be played back to the user on the first user device:
determine a duration of the advertisement content;
select recorded program content of the plurality of program content recorded by the user of the playlist to play back instead of the advertisement content based on a duration of the recorded program content more closely corresponding to the duration of the advertisement content than a duration of any of the other ones of the plurality of program content recorded by the user; and
generate for display the recorded program content on a second user device while the advertisement content is displayed on the first user device.

11. The system of claim 10, wherein the control circuitry is further configured, when generating the playlist, to:
determine a plurality of typical durations of advertisement content, wherein each typical duration of the plurality of typical durations corresponds to a different typical duration of advertisement content; and
add a set of program content recorded by the user to the playlist, wherein each program content of the set corresponds to each respective different typical duration.

12. The system of claim 11, wherein the control circuitry is further configured, when adding the set of program content recorded by the user, to:
automatically record various program content based on the profile;
identify a plurality of segments of the various program content, wherein each segment of the plurality of segments has a duration that corresponds to each respective typical duration, and wherein each segment of the plurality of segments is relevant to the user; and
add each segment of the plurality of segments to the playlist.

13. The system of claim 11, wherein the control circuitry is further configured, when selecting the recorded program content of the plurality of program content recorded by the user to play back instead of the advertisement content, to select first program content of the set that has a duration that corresponds to a duration of the advertisement content.

14. The system of claim 10, wherein the control circuitry is further configured, when selecting the recorded program content of the plurality of program content recorded by the user to play back instead of the advertisement content, to:
identify first program content of the playlist that is relevant to a program that the user is presently viewing;
determine whether the first program content is likely to be interesting to the user based on the profile; and
in response to determining that the first program content is likely to be interesting to the user, select the first program content from the plurality of program content recorded by the user.

15. The system of claim 10, wherein the control circuitry is further configured, when generating for display the recorded program content, to base the generating for display of the program content on at least one of:
receiving user input that requests the advertisement content be replaced by the program content; and
detecting a pre-set request to transition to the recorded program content when any advertisement content is played back.

16. The system of claim 10, wherein the control circuitry is further configured to:
periodically evaluate the playlist;
determine, during the evaluating, whether first program content of the playlist is no longer relevant to the user, wherein determining that the first program content of the playlist is no longer relevant to the user is based on at least one of: genre of the first program content, age of the first program content, and type of the first program content; and
in response to determining that the first program content of the playlist is no longer relevant to the user, remove the first program content from the playlist.

17. The system of claim 10, wherein the user is presently viewing a program that is provided through the Internet, wherein the advertisement content is Internet advertisement content, and wherein the control circuitry is further configured to:
determine a duration of the Internet advertisement content based on an indicia of the duration by the Internet advertisement content, and wherein the control circuitry is further configured, when selecting the recorded program content of the plurality of program content recorded by the user of the playlist to play back, to select program content that has a duration which corresponds to the duration of the Internet advertisement content.

18. The system of claim 10, wherein the playlist comprises both (1) content caused to be recorded by user equipment of the user, and (2) streaming content.

* * * * *